Feb. 26, 1963        J. A. OTLEY        3,079,192
CARGO SLING
Filed May 27, 1960
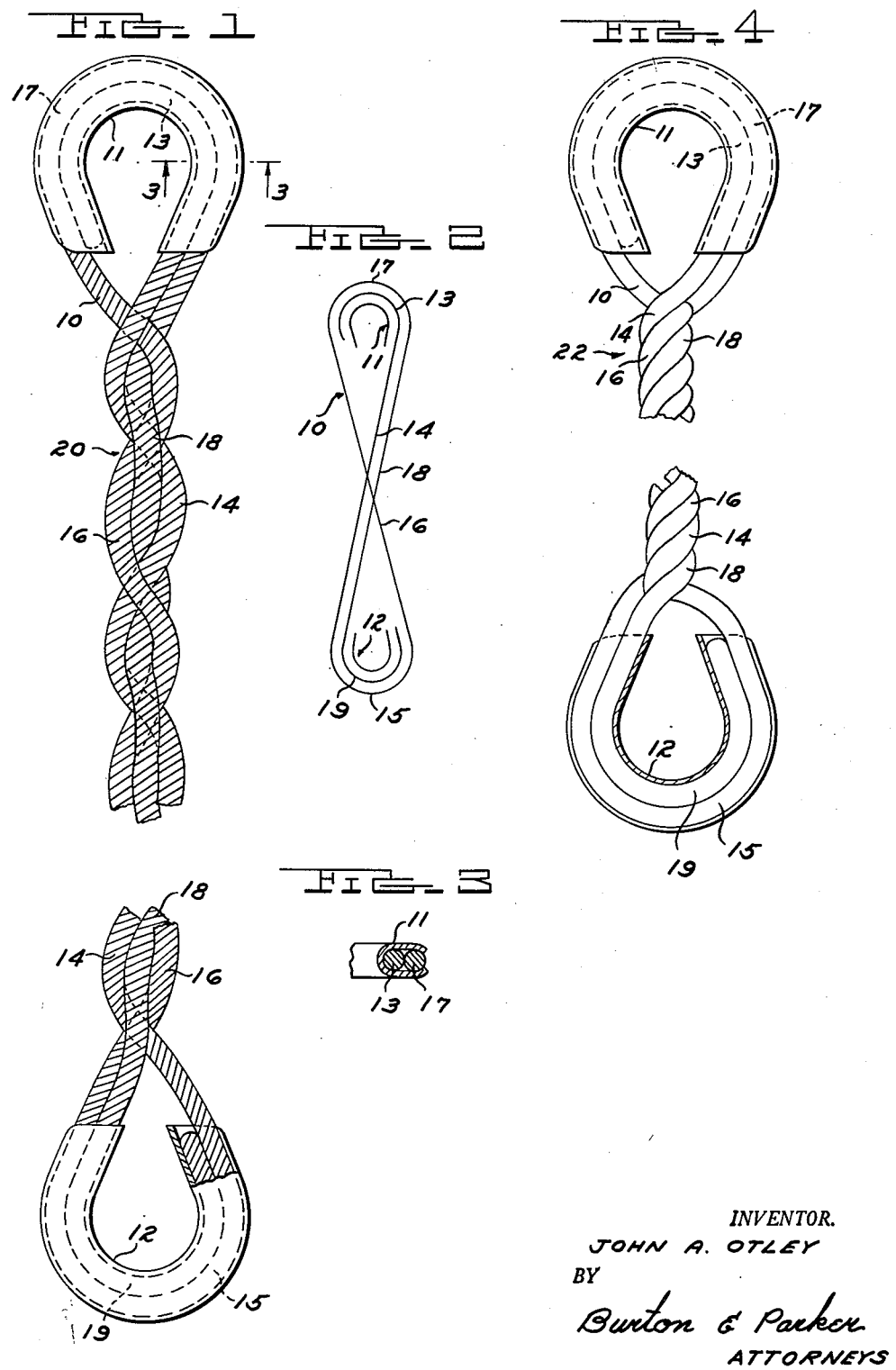
INVENTOR.
JOHN A. OTLEY
BY
Burton & Parker
ATTORNEYS United States Patent Office 3,079,192
Patented Feb. 26, 1963

3,079,192
CARGO SLING
John A. Olley, 4620 Moran Ave., Detroit 7, Mich.
Filed May 27, 1960, Ser. No. 32,284
4 Claims. (Cl. 294—74)

This invention relates to an improvement in cargo slings, and particularly, though not exclusively, to slings of the type having a pair of loops or lifting eyes at opposite ends of a load-supporting portion extending between the eyes.

In the erection of buildings it is conventional practice to lift steel beams and the like from ground level to an upper floor with the aid of slings. In the loading and unloading of ships, trucks, and the like, or in towing of objects, it is customary to convey certain types of cargo with the aid of slings. Cargo slings which have heretofore been developed usually comprise a length of wire cable or rope and the like having a loop or bight at each end thereof and at the base of each loop a clamp for holding in place adjacent portions of the rope, which form the loop. Each loop, in order to distribute forces applied thereto evenly about the loop, may be provided with a thimble or guard, which is in the form of a rigid, arcuate member positioned on the inside of the loop and defining the inner arc of curvature at the outer end of the loop.

Slings of this construction have an inherent disadvantage in that the terminal portions of the rope can slip through and pull away from the clamps and the loops can close. The reason is that in each case the clamp holds the terminal portions of the rope mostly by grip forces acting perpendicularly to the tension forces generated when a load is applied to the sling.

Another object of my invention is the provision of a sling formed of wire rope, cable, or fibre strands (either natural or synthetic) which does not require the use of cable clamps or the like devices, welding or splicing, and which will secure the free end portions of the rope, and the loops at opposite ends of the sling, in tight, frictionally locked relation with adjacent portions of the rope, with the amount of frictional locking force imposed on the sling.

Another object of the invention is the provision of means for securing adjacent portions of a sling together in locked non-slipping relation and which will allow more rapid economical manufacture than has been heretofore possible consistent with the production of a sling which embodies the advantageous features herein recited.

An object of this invention is to provide an improved cargo sling.

A particular object of this invention is to provide an improved cargo sling of inherently great strength.

A specific object of this invention is to provide a cargo sling wherein the terminal portions of the rope are secured by the tension forces on the sling when under load handling conditions with such brought to bear perpendicularly to the frictionally engaging surfaces at the terminal portions of the rope.

In conventional slings the end portions of the rope are secured against slippage by frictionally securing them as by cable clamps or splicing to that portion of the sling extending between the loops at oposite ends of the sling. In the invention herein disclosed the end portions are secured against slippage within the loops themselves, and that portion of the sling extending between the loops is not relied upon to prevent relative slippage between the rope portions comprising the sling.

In summary, this invention involves an improved cargo sling with a structure based on the general concept of a length of rope formed into a number of cooperative portions which frictionally engage one another to maintain the rope in the form of the sling. Another concept involved in this invention is the employment of these cooperative portions of the rope at the points of generation of tension forces and in such a fashion that tension forces are brought to bear perpendicularly to the frictionally engaging surfaces of the rope.

These and other concepts are present in the embodiments of this invention illustrated in the drawings which form a material part of the disclosure.

In the drawings:

FIG. 1 is a lengthwise view of a preferred embodiment of the cargo sling of this invention;

FIG. 2 is a diagrammatic illustration of the various portions of the cargo sling of this invention, and the positions thereof relative to one another;

FIG. 3 is a cross sectional view through a terminal loop of the cargo sling of FIG. 1, which view has been taken as indicated by the sectioning plane 3—3; and FIG. 4 is a lengthwise view of another preferred embodiment of the cargo sling of this invention.

With reference to FIG. 2 of the drawings, the cargo sling of this invention comprises a length of rope 10 and a pair of rigid, protective loop sheaths or guards or thimbles 11 and 12.

In accordance with this invention, the rope 10 comprises, starting at one end thereof, a first end loop portion 13, a first intermediate portion 14, a second end loop portion 15, a second intermediate portion 16, a third end loop portion 17, a third intermediate portion 18, and a fourth end loop portion 19. The first end loop portion 13 is positioned inside of the third end loop portion 17. The fourth end loop portion 19 is positioned inside the second end loop portion 15. Between the end loop portions, the first intermediate portion 14, the second intermediate portion 16, and the third intermediate portion 18 of the rope 10 are wrapped together.

The sheath 11 in combination with the first end loop portion 13 and third end loop portion 17 of the rope 10 together form one terminal loop or eye of the cargo sling.

The sheath 12 in combination with the second end loop portion 15 and the fourth end loop portion 19 form the other terminal loop or eye of the sling. The sheaths 11 and 12 shown in FIGS. 1, 3, and 4 are rigid metallic casing elements which, in plan view, appear somewhat horseshoe shaped. In cross sectional view as in FIG. 3 each of these elements appears somewhat U-shaped with the bight of the U being on the inner arc of the element and the opening between the legs of the U being on the outer arc of the element. The inner arc of the sheaths 11 and 12 conforms to the desired inner arcuate shape of the desired terminal loop of the cargo slings 20 and 22.

This general structure as diagrammatically shown in FIG. 2 is involved in the cargo sling 20 of FIG. 1. In addition, the first intermediate portion 14, the second intermediate portion 16, and the third intermediate portion 18 of the rope 10 involved in the cargo sling 20 are intertwined along the lengths thereof so as to be braided together. This structure can be obtained in the following manner:

Loops are formed about the sheaths 11 and 12 out of the first end loop portion 13, the second end loop portion 15 and the third end loop portion 17 of the rope 10, and then placed relative to one another as shown in FIG. 2 but without forming a loop in the fourth end loop portion 19. Extending from the third end loop portion 17 will be that part of the rope 10 which ultimately will form the third intermediate portion 18 and the fourth end loop portion 19. The first end loop portion 13 and third end loop portion 17 and sheath 11 together are then twisted in one direction while establishing and maintaining the second end loop portion 15 and sheath 12 in stationary position or while twisting the end loop portion 15 and sheath 12 in the opposite direction. This causes the first and second intermediate portions 14 and 16 to wind about one another. The remaining portion of the rope 10, which is to form the third intermediate portion 18 and the fourth end portion 19, starting at the base of the first and third end loop portions 13 and 17, is then interlaced over and under the exposed segments of the first and second intermediate portions 14 and 16 until the base of the second end portion 15 is reached. At this point, the remaining portion of the rope 10 is slipped inside of the second end loop portion 15 and between it and the bottom of the U-shaped channel of sheath 12 to form the fourth end loop 19.

It will be noted that the terminal ends of the rope 10, which form the first end loop portion 13 and fourth end loop portion 19 are on the inner sides of the third and second end loop portions 17 and 15 respectively and between such end loop portions and the bottom of the U-shaped channels of the sheaths. The outer arcuate margins of the sheaths are crimped inwardly towards each other to hold the end loop portions tightly against one another in stacked relationship, as indicated in FIG. 3.

The general structure shown in FIG. 2 is also employed in the cargo sling 22 of FIG. 4. In this embodiment, the first, second, and third intermediate portions 14, 16, and 18 are wound about one another along the lengths thereof. In winding these portions together they are wound in the direction of the inherent twist of the rope. This structure can be obtained in the following manner.

Referring to FIG. 2, the sheaths are placed in spaced-apart relation as shown. The terminal end portion 13 is laid in the channel of sheath 11 and temporarily held there in any suitable fashion and the rope led to and around sheath 12, being placed in the channel thereof. The sheaths and rope loops therein are thereupon twisted in the same direction while the rope portion 16 is led back toward sheath 11. The direction in which the sheaths 11 and 12 are twisted should be such that rope portion 16 will follow its inherent direction of twist as it winds about portion 14. When portions 14 and 16 have been twisted together between the bases of the loops at opposite ends of the sling, the rope is then carried around sheath 11, being placed in the U-shaped channel thereof on top of the terminal portion 13, and the twisting of the loops is then continued as portion 18 is led back toward sheath 12. When portion 18 has been laid up around portions 14 and 16 from the base of loop at sheath 11 to the base of the loop at sheath 12, the end portion 19 is tucked within the U-shaped channel of sheath 12 beneath the loop portion 15. Any excess is then cut off so that the rope terminates as shown in FIG. 4. The outer arcuate edges of the channel walls of the sheaths 11 and 12 are crimped over the loops in channels as shown in FIG. 3.

Thus, there is provided a cargo sling of inherently great strength. The chances of failure of any part thereof are made practically nil by the principles of construction generally and specifically involved therein. Because of the loop sheaths or guards 11 and 12, buckling of the end loop portions is prevented. In addition, by forming the terminal ends of the rope 10 into end loops in combination with the corresponding second and third end loop portions of the rope 10, all looped portions of the rope 10 are held together by friction which increases with an increase in the tension on the sling resulting from a load thereon. In addition, because of this structural requirement of this invention, frictional forces are employed most advantageously relative to the tension forces tending to draw apart the various adjacent portions of the rope 10. The terminal end portions 13 and 19 are securely locked in the sheaths beneath the second and third loop portions and this locking effect increases as the tension on the sling increases.

No reliance is placed on the braiding or twisting together of portions 14, 16, and 18 to prevent the rope portions from slipping relative to each other and unraveling of the sling. The braiding or twisting of portions 14, 16, and 18 is merely to integrate these portions into a single load-carrying sling portion extending between the loops, insuring uniform load distribution on portions 14, 16, and 18, and also insuring that workmen will not be able to accidentally insert their hands or fingers between portions 14, 16, and 18 just before tension is placed on the sling.

Other advantages, meritorious features, and embodiments will occur to those of ordinary skill in the art upon reading the foregoing description. In this regard, it should be noted that the embodiments illustrated in the drawings are set forth for purposes of illustration and not for purposes of restriction since the scope of this invention is defined by the appended claims rather than by the description preceding them, and all embodiments which fall within the metes and bounds of the claims are intended to be embraced by the claims unless expressly excluded thereby.

I claim:

1. A cargo sling comprising a length of rope and a pair of protective, rigid, loop sheaths, said length of rope having in order a first end loop portion containing one free end of said rope, a first intermediate portion, a second end loop portion, a second intermediate portion, a third end loop portion, a third intermediate portion, and a fourth end loop portion containing the other free end of said rope, said first end loop portion being on the inner side of said third end loop portion at one end of said sling, said fourth end loop portion being on the inner side of said second end loop portion at the other end of said sling, and said first, second, and third intermediate portions being adjacent one another and wrapped together between said end loop portions, one of said loop sheaths encasing the looped portions at said one end of said sling and holding the same in place, and the other said loop sheaths encasing the looped portions of said other end of said sling and holding the same in place.

2. A cargo sling comprising a length of rope and a pair of protective, rigid, loop sheaths, said length of rope having in order a first end loop portion containing one free end of said rope, a first intermediate portion, a second end loop portion, a second intermediate portion, a third end loop portion, a third intermediate portion, and a fourth end loop portion containing the other free end of said rope, said first end loop portion being on the inner side of said third end loop portion at one end of said sling, said fourth end loop portion being on the inner side of said second end loop portion at the other end of said sling, and said first, second, and third intermediate portions being adjacent one another and braided together along the lengths thereof between said end loop portions, one of said loop sheaths encasing the looped portions at said one end of said sling and holding the same in place, and the other said loop sheaths encasing the looped portions of said other end of said sling and holding the same in place.

3. A cargo sling comprising a length of rope and a pair of protective rigid, loop sheaths, said length of rope having in order a first end loop portion containing one free end of said rope, a first intermediate portion, a second end loop portion, a second intermediate portion, a third end loop portion, a third intermediate portion, and a fourth end loop portion containing the other free end of said rope, said first end loop portion being on the inner side of said third end loop portion at one end of said sling, said fourth end loop portion being on the inner side of said second end loop portion at the other end of said sling, and said first, second, and third intermediate portions being adjacent one another and wound around one another along the lengths thereof between said end loop portions, one of said loop sheaths encasing the looped portions at said one end of said sling and holding the same in place, and the other of said loop sheaths encasing the looped portions of said other end of said sling and holding the same in place.

4. A cargo sling formed of rope and having a lifting eye at each end comprising: a continuous length of rope having opposite ends with the rope laid back upon itself to form a cargo-lifting portion and a pair of nesting loops at each of the opposite ends of the cargo-lifting portion, a pair of thimble means, one for each pair of loops, with each thimble means having a rope loop receiving channel within which the pair of nesting loops is received and held in stacked relation, with one loop disposed inside the other, the inner loop of each stacked pair comprising a portion of the rope terminating in one of said rope ends, whereby tension forces on the sling will cause the outer loops of said pairs to frictionally grip the inner loops thereof to prevent the portions of the rope terminating in the ends from pulling out of the eyes.

References Cited in the file of this patent

UNITED STATES PATENTS

| | | |
|---|---|---|
| 1,222,048 | Sunderland | Apr. 10, 1917 |
| 2,152,096 | Russell | Mar. 28, 1939 |
| 2,184,466 | Ost et al. | Dec. 26, 1939 |
| 2,495,951 | Von Wehrden | Jan. 31, 1950 |
| 2,889,603 | Joy et al. | June 9, 1959 |

FOREIGN PATENTS

| | | |
|---|---|---|
| 646,786 | Great Britain | Nov. 29, 1950 |